(12) United States Patent
Petrie et al.

(10) Patent No.: US 11,525,750 B2
(45) Date of Patent: Dec. 13, 2022

(54) METAL-EMBEDDED OPTICAL FIBERS FOR MONITORING PRESSURE OR CORROSION AT HIGH TEMPERATURES

(71) Applicant: UT-Battelle LLC, Oak Ridge, TN (US)

(72) Inventors: Christian M. Petrie, Knoxville, TN (US); Daniel C. Sweeney, Lenoir, TN (US); Yun Liu, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 274 days.

(21) Appl. No.: 16/865,475

(22) Filed: May 4, 2020

(65) Prior Publication Data

US 2021/0033479 A1    Feb. 4, 2021

Related U.S. Application Data

(60) Provisional application No. 62/880,855, filed on Jul. 31, 2019.

(51) Int. Cl.
*G01D 5/353* (2006.01)
*G01L 9/00* (2006.01)
*G01D 5/26* (2006.01)

(52) U.S. Cl.
CPC ............ *G01L 9/0077* (2013.01); *G01D 5/268* (2013.01); *G01D 5/3537* (2013.01); *G01D 5/35306* (2013.01); *G01D 5/35354* (2013.01)

(58) Field of Classification Search
CPC ..... G01L 9/0077; G01L 11/025; G01D 5/268; G01D 5/35306; G01D 5/35354; G01D 5/3537; G01D 5/35325; G01D 5/35374
See application file for complete search history.

(56) References Cited

U.S. PATENT DOCUMENTS

| 5,714,680 | A  | * | 2/1998 | Taylor | G01L 23/16 |
|---|---|---|---|---|---|
|  |  |  |  |  | 356/519 |
| 2002/0093660 | A1 | * | 7/2002 | Maeda | G01J 9/02 |
|  |  |  |  |  | 356/450 |
| 2004/0239943 | A1 | * | 12/2004 | Izatt | G01N 21/4795 |
|  |  |  |  |  | 356/479 |
| 2008/0141780 | A1 |  | 6/2008 | Wavering et al. |  |
| 2014/0168659 | A1 | * | 6/2014 | Suri | G01D 5/268 |
|  |  |  |  |  | 356/480 |
| 2015/0290711 | A1 |  | 10/2015 | Norfolk et al. |  |
| 2022/0016411 | A1 | * | 1/2022 | Winterwerber | A61M 60/816 |

* cited by examiner

*Primary Examiner* — Jonathan M Hansen
(74) *Attorney, Agent, or Firm* — Warner Norcross + Judd LLP

(57) ABSTRACT

A fiber optic sensor and a related method of manufacture are provided. The fiber optic sensor includes an embedded optical fiber contained within a metal diaphragm assembly, where the terminal end of the optical fiber is positioned opposite a diaphragm. The method includes forming a metal-embedded optical fiber by ultrasonic additive manufacturing and securing the metal-embedded optical fiber to a housing having a diaphragm that is opposite of the terminal end of the optical fiber. The sensor can provide extremely accurate pressure measurement at high temperatures and in highly corrosive media. An optical fiber-based pressure sensing system is also provided.

13 Claims, 6 Drawing Sheets

1: procedure MARC($R$, $z_0$, $S$, $C$)
2:   if $|R| > 1$ then:
3:     if $S \neq 1$ then:
4:       if $R < 0$ then:
5:         $C \leftarrow C - \pi$
6:       $S \leftarrow 1$
7:     $z \leftarrow \arctan(1/\tan(z_0) - 1/(R\sin(z_0)))$
8:   else:
9:     if $S \neq 0$ then:
10:       if $R \leq 0$ then:
11:         $C \leftarrow C + \pi$
12:       $S \leftarrow 0$
13:     $z \leftarrow \arctan(R/\sin(z_0) - 1/\tan(z_0)) - z_0$
14:   $z \leftarrow z + C$
15:   return $z$, $S$, $C$

FIG. 8

METAL-EMBEDDED OPTICAL FIBERS FOR MONITORING PRESSURE OR CORROSION AT HIGH TEMPERATURES

CROSS-REFERENCE TO RELATED APPLICATIONS

This application claims the benefit of U.S. Provisional Application 62/880,855, filed Jul. 31, 2019, the disclosure of which is incorporated by reference in its entirety.

STATEMENT REGARDING FEDERALLY SPONSORED RESEARCH

This invention was made with government support under Contract No. DE-AC05-00OR22725 awarded by the U.S. Department of Energy. The government has certain rights in the invention.

FIELD OF THE INVENTION

The present invention relates to fiber optic sensors for measuring pressure or corrosion and their method of manufacture.

BACKGROUND OF THE INVENTION

Fiber optic sensors are used to monitor pressure and corrosion in harsh, high-temperature environments. Example environments include gas turbines, jet engines, internal combustion engines, molten salt energy storage systems, advanced high-temperature nuclear reactors, oil and gas exploration, the chemical industry and other process control applications. These sensors use interferometry to measure the distance between the end of a fiber optic cable and the reflective surface of a diaphragm. Based upon this distance, a pressure exerted upon the opposite surface of the diaphragm can be determined. Alternatively, a diaphragm thickness can be determined, and from this information, a measure of corrosion of the diaphragm can be calculated.

Despite their general acceptance, there exists a need for fiber optic sensors that can operate at elevated temperatures (approaching 900° C.) for extended periods of time or when exposed to highly corrosive environments, such as corrosive molten salts, and that have a long service life. Further, there remains a need for fiber optic sensors having high accuracy and allowing for continuous measurement of corrosion and/or pressure over a span of time.

SUMMARY OF THE INVENTION

A fiber optic sensor and a method of manufacture are provided. In one embodiment, the fiber optic sensor includes an embedded optical fiber contained within a diaphragm assembly, where the terminal end of the optical fiber is positioned opposite a diaphragm. The optical fiber is directly embedded into the metal diaphragm assembly, rather than being fixed in place with an epoxy or by friction-based processes. The resulting fiber optic sensor is extremely accurate at high temperatures and in corrosive media, and fluid pressure can be determined by measuring the length of the cavity between the end of the embedded fiber and the diaphragm. Similarly, the diaphragm thickness can be determined by accurately controlling pressure and relating the measured cavity length to a change in thickness.

In one embodiment, a method for manufacturing the fiber optic sensor generally includes embedding an optical fiber within a metallic matrix using an ultrasonic additive manufacturing process to yield a metal-embedded optical fiber. For example, the method can include ultrasonically welding successive layers of metal tape together to form a metallic matrix around an optical fiber and securing the metal-embedded optical fiber within a metallic housing assembly including a diaphragm. The terminal end of the optical fiber is positioned opposite a reflective surface of the diaphragm such that light exiting the optical fiber is directed toward this surface and is reflected back toward the optical fiber terminus. The metal-embedded optical fiber is disposed at a distance from the surface of the diaphragm to define a cavity having a gap distance.

The fiber optic sensor according to these and other embodiments improves upon existing sensor technologies by increasing the operational temperature range, improving accuracy, reducing temperature sensitivities, and offering flexibility in the sensor packaging material depending on the intended application. Multiple pressure sensors could be used in combination with an orifice plate to measure flow based on differential pressure across the orifice plate. The fiber optic sensor can include a long service life and allow for continuous monitoring of corrosion and/or pressure, optionally for in situ corrosion monitoring at temperatures that range from 500-900° C. The fiber optic sensor can provide extremely accurate pressure measurements (on the order of 0.001% of full scale) at high temperatures and in highly corrosive media.

In another embodiment, an optical fiber-based pressure sensing system is provided. The pressure sensing system includes a fiber optic sensor optically coupled to an interferometer to measure deflections in the fiber optic sensor's reflective diaphragm. The interferometer can include a low coherence light source, and optical coupler, a sensing arm of variable length, and a fixed-length reference arm. Light leaving the reference and sensing arms creates an interference pattern that is used to calculate differences in path length between the reference and sensing arms. A real-time time-domain phase demodulation scheme extracts sub-nanometer length changes of a Fabry-Pérot cavity to measure pressure. The optical fiber-based pressure sensing system provides a robust platform for sensing in harsh conditions including nuclear and energy applications and can compensate for radiation-induced attenuation (RIA) in the optical fiber. The pressure sensing system can also be extended to a wide range of applications benefiting from high-frequency dynamic pressure measurements in harsh environments.

These and other features and advantages of the present disclosure will become apparent from the following description of particular embodiments, when viewed in accordance with the accompanying drawings and appended claims.

BRIEF DESCRIPTION OF THE DRAWINGS

FIG. 8 includes pseudocode for performing time-domain phase demodulation of an interferometry output for determining the phase shift induced by diaphragm deflections at a Fabry-Pérot cavity within a fiber optic pressure sensor.

DETAILED DESCRIPTION OF THE CURRENT EMBODIMENTS

Figure 1:
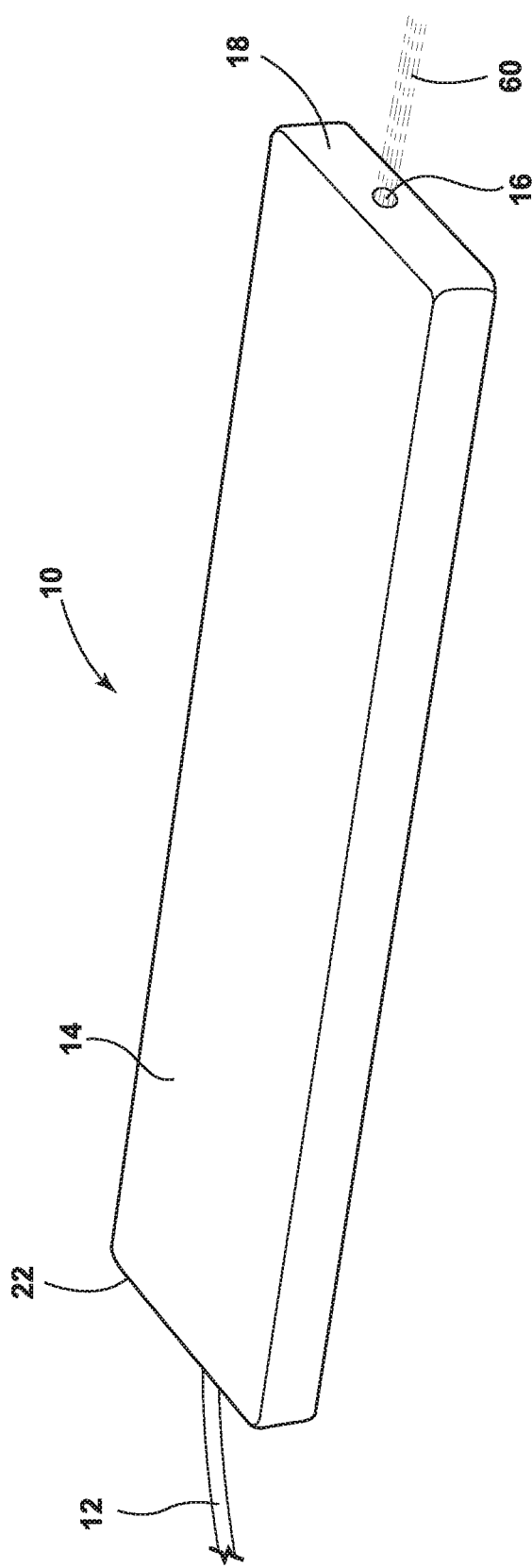
FIG. 1 is a perspective view of a metal-embedded optical fiber in accordance with a current embodiment.

The current embodiments include a fiber optic sensor and a pressure sensing system using the fiber optic sensor. The fiber optic sensor and its method of manufacture are discussed in Part I below, and the pressure sensing system is discussed in Part II below. The fiber optic sensor is generally manufactured by forming a metallic matrix around an optical fiber by ultrasonic additive manufacturing (UAM), resulting in a metal-embedded optical fiber, and securing the metal-embedded optical fiber to a housing such that the terminal end of the optical fiber is opposite of a diaphragm. The resulting fiber optic sensor includes an embedded optical fiber contained within a metal diaphragm assembly for providing extremely accurate pressure measurement at high temperatures and in highly corrosive media, optionally as part of an interferometry system.

I. Fiber Optic Sensor

The fiber optic sensor includes an embedded optical fiber that is directly embedded into a metal diaphragm assembly, rather than being fixed in place with an epoxy or by friction-based processes. Forming an embedded optical fiber generally includes the buildup of a metallic matrix, layer by layer, by ultrasonically welding successive layers of a thin metal tape into a three-dimensional shape. In one embodiment, high frequency vibrations are locally applied to a metal foil material, for example aluminum foil, which is held against an underlying layer with high pressure to create a solid-state weld between adjacent layers. At the interface between adjacent layers, ultrasonic welding occurs due to high-pressure dispersion of surface oxides and yielding of surface asperities due to high-frequency mechanical motions and absorption of vibrational energy. The layer-by-layer build-up of the metal matrix occurs perpendicular to the length of the optical fiber, such that the optical fiber is sandwiched between successive metal layers of the overall build. For example, a slot can be machined in an aluminum layer, and an aluminum coated optical fiber is then placed inside the slot. Successive layers of aluminum are added to the aluminum body to embed the aluminum coated optical fiber therein, the successive layers being bonded together using an ultrasonic scrubbing motion. The aluminum body is optionally itself formed by UAM.

Using UAM to embed the optical fiber into a metallic matrix eliminates the need for using any resins (e.g., epoxy resins) or friction-based processes to secure the optical fiber within the metallic matrix. Epoxy and/or friction-based processes can suffer from breakdown at high temperature or from exposure to ionizing radiation. Using UAM to embed the optical fiber within the metallic matrix further overcomes various challenges inherent in efforts to join together materials having different thermal expansion coefficients and/or temperature sensitivities. UAM is performed at less than the melting temperature of the metallic matrix, for example about 150° C.

An example UAM welding apparatus is set forth in U.S. Patent Publication 2015/0290711 to Norfolk et al, the disclosure of which is hereby incorporated by reference in its entirety. The UAM welding apparatus can include (a) a press to apply pressure to two parts (e.g., a tape and a substrate) to be welded together, (b) a nest or anvil where the parts are placed to allow high frequency vibrations to be directed toward an interface of the parts, (c) an ultrasonic stack including a converter or a piezoelectric transducer for converting an electrical signal into a mechanical vibration, a sonotrode or horn for applying mechanical vibrations to the metallic matrix, and an optional booster for modifying the amplitude of vibration, (d) an electronic ultrasonic generator or power supply delivering a high power AC signal with frequency matching a resonance frequency of the stack, and (e) a controller for controlling movement of the press and delivery of ultrasonic energy. In various embodiments, all components of the stack are tuned to resonate at the same ultrasonic frequency, where the frequency is optionally 20 kHz, 30 kHz, 35 kHz, or 40 kHz. Ultrasonic vibrations of the sonotrode are generally parallel to surfaces of the workpiece, and the sonotrode may be formed of various materials, optionally titanium, aluminum, or steel.

Figure 4:
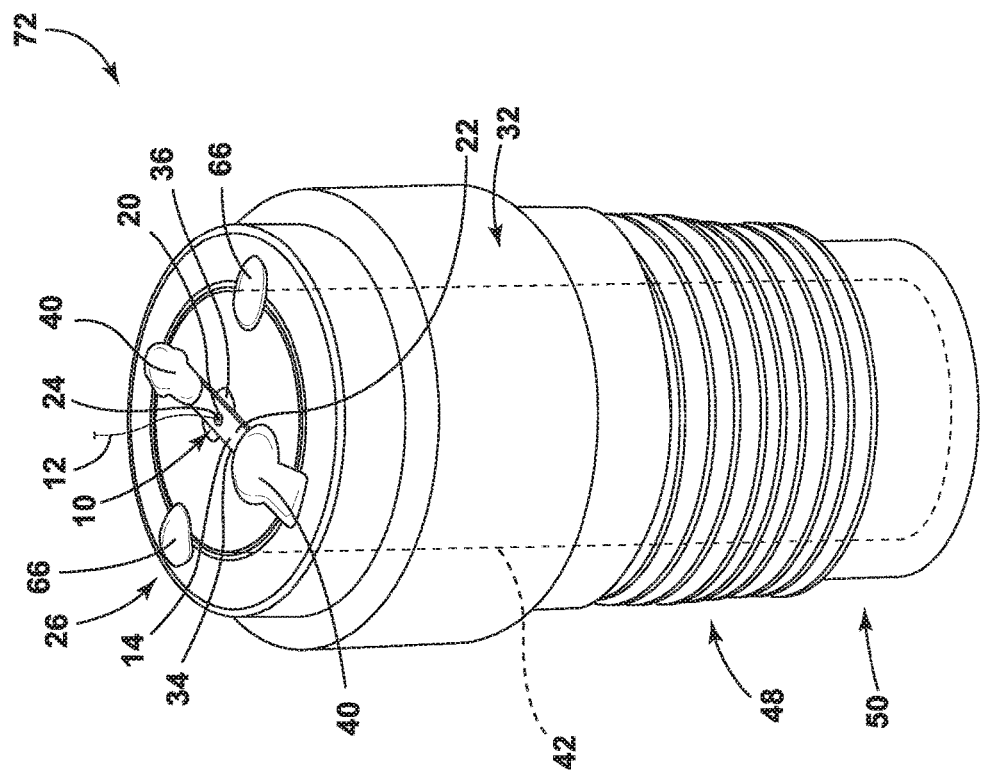
FIG. 4 is a perspective view of the holder of FIG. 3 secured to a diaphragm assembly.
Figure 3:
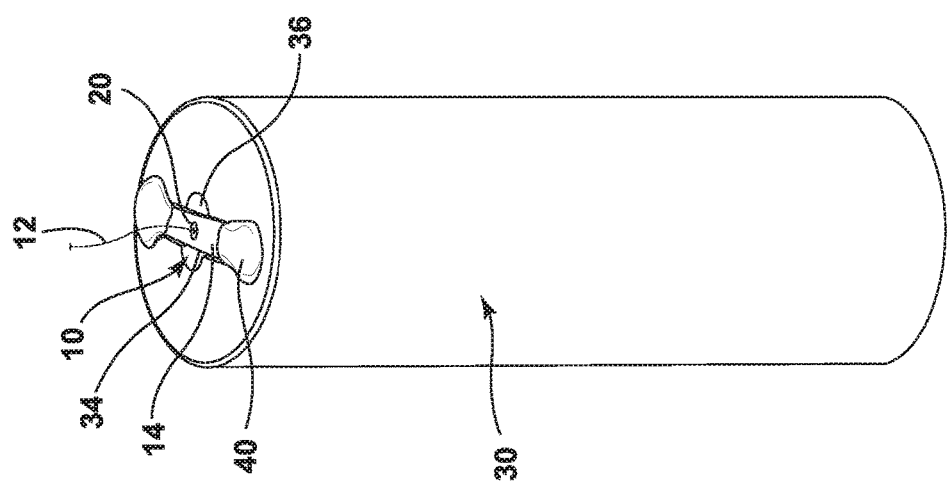
FIG. 3 is a perspective view of the metal-embedded optical fiber of FIG. 1 secured to a holder.

Referring to FIG. 1, an embedded optical fiber formed by UAM is illustrated and generally designated 10. The embedded optical fiber 10 includes an optical fiber 12 contained within a metallic matrix 14. The metallic matrix 14 is manufactured from an aluminum alloy in the current embodiment, for example AL-6061, but can be manufactured from other materials in other embodiments, for example nickel alloys (e.g., Ni-200) and stainless steel. The metallic matrix can have any of various shapes appropriate to a particular end-use. In the embodiment illustrated in FIG. 1, the metallic matrix 14 has a cuboid shape, while in other embodiments the metallic matrix includes a cylindrical shape, a cubical shape, or a prismatic shape having a polygonal cross-section (e.g., triangular cross-section, pentagonal cross section, hexagonal cross-section). The optical fiber 12 is a single-mode aluminum coated AL1300 optical fiber (IVG Fiber, Toronto, Canada) and terminates at a terminal end 16 to form a polished surface flush with (i.e., coplanar with) a first end-surface 18 of the metallic matrix 14. As shown in FIGS. 3-4, the metallic matrix 14 can define an exit aperture 20 at a second end-surface 22 opposite the first end-surface 18, such that the exit aperture 20 surrounds at least an exit portion of the optical fiber 12. In the current embodiment, the optical fiber 12 is a silica optical fiber. In other embodiments, the optical fiber 12 is manufactured from materials comprising silica, fluorozirconate, fluoroaluminate, calcogenide glasses, polymers, crystalline materials (e.g., sapphire), or mixtures thereof. In various embodiments the optical fiber 12 is coated, optionally with a metal coating (e.g., Al, Cu, No or AU) or coated with a UV-cured urethane acrylate composite or polyamide material. In some embodiments the optical fiber 12 includes a plurality of coatings layered in succession one upon the other. In some embodiments, a plurality of optical fibers 12 may be embedded within a common metallic matrix, for example aluminum.

Figure 2:
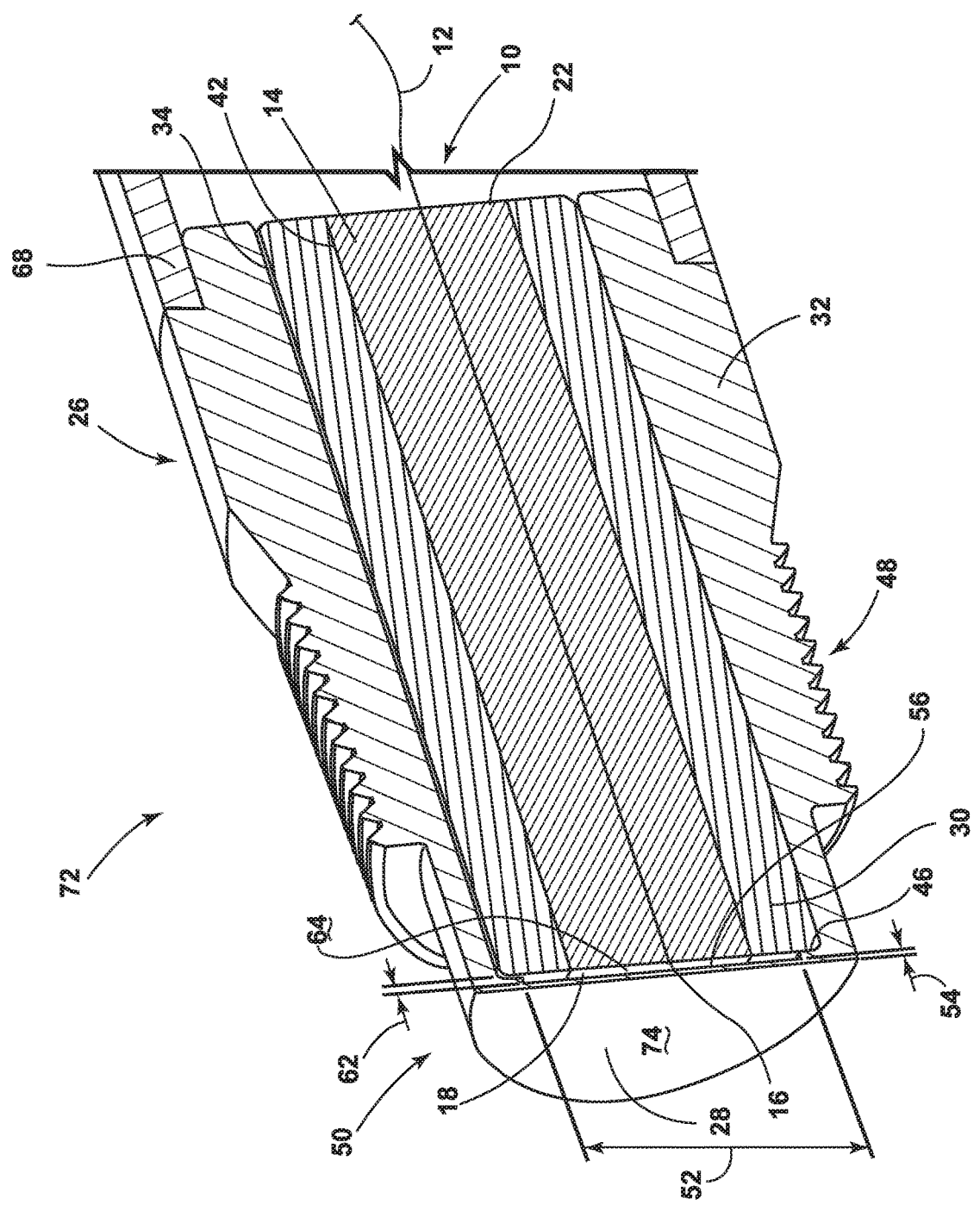
FIG. 2 is a cross-sectional view of a fiber optic sensor including the metal-embedded optical fiber of FIG. 1.

As noted above, the method of manufacturing a fiber optic sensor 72 further includes securing the metal-embedded optical fiber 10 to a housing having a diaphragm that is opposite of the terminal end 16 of the optical fiber 12. As shown in FIGS. 2-4, for example, the embedded optical fiber 10 is housed within a sensor housing 26 (FIG. 2) having a holder 30 (FIG. 3) and a diaphragm assembly 32 (FIG. 4). The embedded optical fiber 10 is received within the holder 30, which is in turn received within the diaphragm assembly 32. In particular, the metal-embedded optical fiber 10 is inserted into a slot 34 in the holder 30 and is then secured to the holder 30, optionally by a weld 40.

As shown in FIGS. 2 and 4, the diaphragm assembly 32 defines a holder aperture 42. The holder aperture 42 includes an annular shelf 46 at an end thereof disposed adjacent to the diaphragm 28. A threaded external surface 48 extends along an intermediate portion of the diaphragm assembly 32, and an end portion 50 of the diaphragm assembly 32 is cylindrical in shape and includes no threading. The diaphragm assembly 32 includes a diaphragm 28 having a diaphragm diameter 52 and a diaphragm thickness 54. Optionally, the diaphragm diameter 52 is from 0.5 cm to 2 cm, from 0.25 cm to 1.5 cm, or about 1 cm. Optionally, the diaphragm thickness 54 is from 200 µm to 1000 µm, from 300 µm to 750 µm, or from 400 µm to 600 µm. The holder 30 and/or diaphragm assembly 32 may be manufactured independently of any of various materials known in the art and appropriate to an end-use of the sensor housing 26, optionally aluminum, nickel, copper, stainless steel, polymeric materials, alloys, or various combinations thereof. Optionally, the holder 30 and the diaphragm assembly are monolithic in construction. Optionally the diaphragm 28 has a material composition that is distinct from that of other portions of the diaphragm assembly 32; for example, the diaphragm 28 may be manufactured of one material and the remainder of the diaphragm assembly 32 may be manufactured of a different material.

The terminal end 16 of the optical fiber 12 is positioned in opposition to the first surface 56 of the diaphragm 28 such that light 60 exiting the optical fiber 12 is directed toward the first surface 56 and is reflected from the first surface 56 back toward the optical fiber 12. The annular shelf 46 helps to maintain a gap distance 62 between the first surface 56 of the diaphragm 56 and the terminal end 16 of the optical fiber 12. The annular shelf 46 helps to ensure that the metal-embedded optical fiber 10 is disposed at a distance from the first surface 56 of the diaphragm 28 to define a gap 64 (alternatively referred to as a Fabry-Pérot cavity) having the gap distance 62. The gap distance 62 is optionally from 50 µm to 1000 µm, from 100 µm to 750 µm, or from 250 µm to 500 µm. Following feeding the holder 30 into the holder aperture 42, the holder 30 is secured within the diaphragm assembly 32, optionally by a weld 66.

In various embodiments, dimensions and material construction of the diaphragm 28 are selected to achieve a set diaphragm pressure sensitivity. Equations (1) and (2) below may be used to determine appropriate diaphragm 28 dimensionality and material construction to achieve a particular pressure sensitivity, where d is diameter, h is thickness, E is elastic modulus, µ is Poisson's ratio, and K is a constant of proportionality dependent on strain gauge orientation and position on the diaphragm. Equation (1) may be used to calculate theoretical diaphragm displacement sensitivity (y/P), and equation (2) may be used to calculate theoretical strain sensitivity (ε/P) when operating within the linear region (y/h<0.3). Diaphragm displacement sensitivity and strain sensitivity are directly correlated with diaphragm pressure sensitivity. Equations (1) and (2) demonstrate the high-order dependence of displacement and strain on diaphragm thickness ($h^{-3}$ for displacement, and $h^{-2}$ for strain), which means that small alterations in the thickness of the diaphragm 28 effect large alterations in pressure sensitivity thereof.

$$\frac{y}{P} = \frac{3(1-\mu^2)d^4}{256Eh^3} \quad (1)$$

$$\frac{\varepsilon}{P} = \frac{d^2}{Eh^2}K \quad (2)$$

The method can also include securing an extension tube 68 to an end of the diaphragm assembly 32 opposite the diaphragm 28. The extension tube 68 may be secured to the diaphragm assembly 32 by a weld. In various embodiments, the holder slot 34 includes one or a plurality of ventilation indentations 36 extending along a length of the holder, where the ventilation indentations 36 optionally include a semicircular cross-section. Optionally, an interior space of the extension tube 68 is in fluid communication with the ventilation indentation 36 and the first surface 56 of the diaphragm 28. The extension tube 68 may be manufactured of any of various materials known in the art and appropriate to an end-use of the extension tube 68, optionally aluminum, nickel, copper, stainless steel, polymeric materials, alloys, or various combinations thereof.

The fiber optic sensor 72 may be used to determine the pressure of a fluid in contact with the diaphragm 28 by measuring the gap distance 62 using interferometry. The gap distance 62 can be determined using an optical interference pattern produced by a combination of light reflections from the terminal end 16 of the optical fiber 12 (i.e., the fiber terminus) and from the first surface 56 of the diaphragm 28. Extrinsic Fabry-Pérot Interferometric (EFPI) technology may be used to measure gap distance 62 based upon a low-finesse Fabry-Pérot cavity (i.e., gap 62) formed between the terminal end 16 of the optical fiber 12 and the first surface 56 of the diaphragm 28. A relationship between gap distance 62 and pressure or between changes in gap distance 62 and pressure can be determined through calibration and/or correlation. In various embodiments, the measurement method does not include measurement of gap distance 62 but, rather, the measurement method includes measurement of changes or a change in gap distance 62 over a period of time or between two time points.

As discussed above, diaphragm thickness 54 influences the sensitivity of the diaphragm (i.e., a magnitude of change in gap distance 62) to a given pressure exerted thereupon by a fluid. Therefore, the measurement method can include applying a known pressure to the first surface 56 or to the second surface 74 of the diaphragm 28 to allow for the calculation of the diaphragm thickness 54. The measurement method in various embodiments is an active measurement method including applying a fluid pressure to the first surface of the diaphragm 56. The measurement method in various embodiments is a passive measurement method including applying ambient atmospheric pressure (i.e., vent pressure) to the first surface 56 of the diaphragm 28. The extension tube 68 may function in combination with the ventilation indentations 36 to allow for a set/known fluid pressure to be applied to the first surface 56 of the diaphragm 28.

Figure 6:
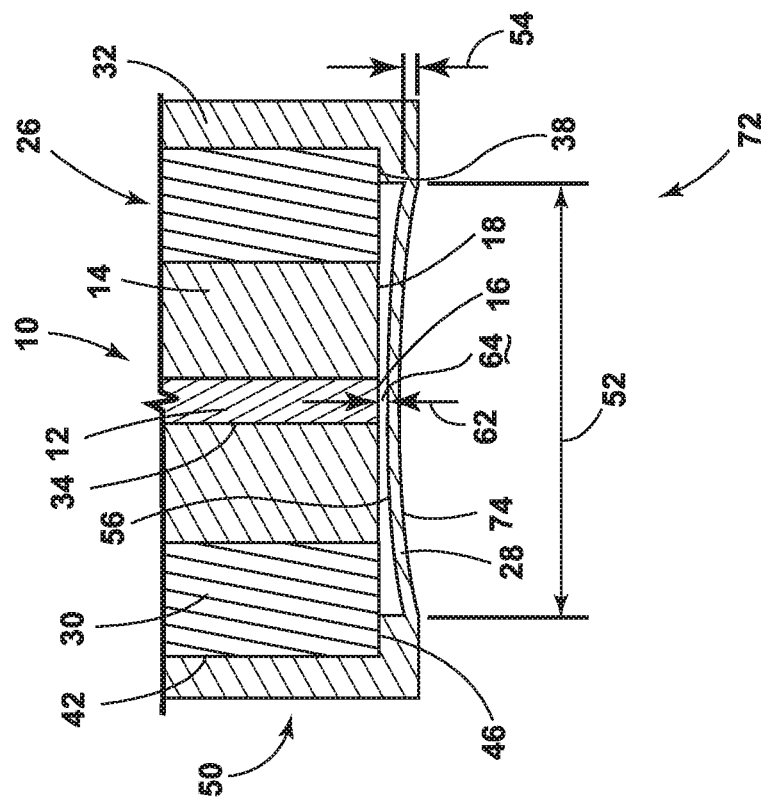
FIG. 6 is a diagram showing a cross-section of a fiber optic sensor where a diaphragm is being deflected by a fluid exerting a pressure upon the diaphragm.
Figure 5:
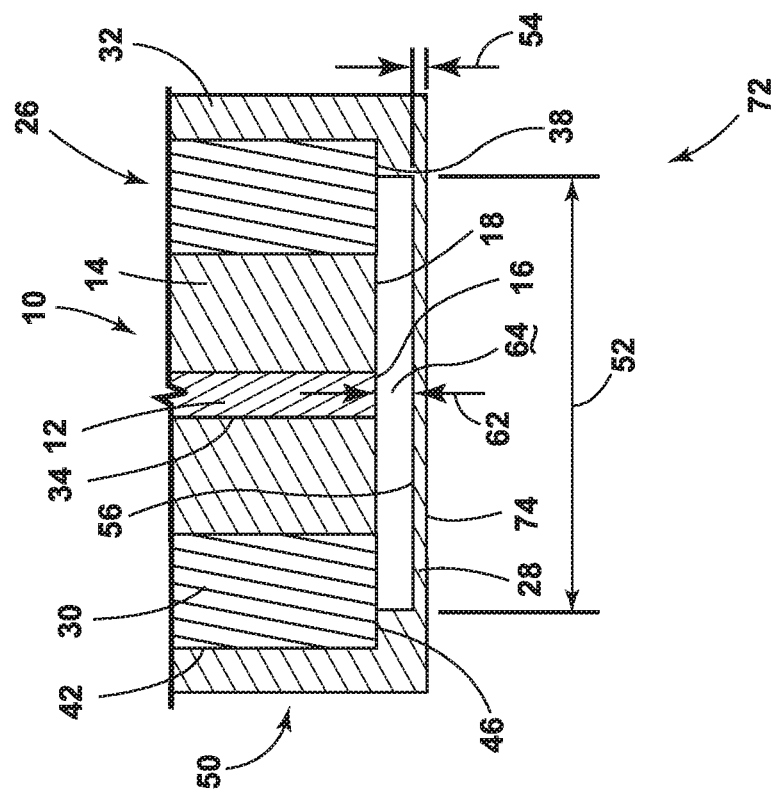
FIG. 5 is a diagram showing a cross section of a fiber optic sensor where a diaphragm is not being deflected by a fluid exerting a pressure upon the diaphragm.

As shown in FIGS. 5 and 6, the diaphragm 28 deflects in response to a fluid pressure exerted upon a surface 74 thereof. A degree of deflection, measured as change in gap distance 62, may be correlated with the diaphragm thickness 54 and/or a pressure applied to a surface 56, 74 of the diaphragm 28. Therefore, a measurement method may include calculating a thickness 54 of the diaphragm 28 (i.e., diaphragm thickness 54) based upon a pressure applied to a surface 56, 74 of the diaphragm 28. As a fluid corrodes the diaphragm 28, the diaphragm thickness 54 decreases; thus, the measurement method in various embodiments includes determining a degree of corrosion of the diaphragm 28 based upon a change in diaphragm thickness 54 or a change in gap distance 62 in response to a known pressure applied to a surface 56, 74 of the diaphragm 28. A range and/or sensitivity of the physical effects sensor 72 may be optimized for a given application by optimizing diaphragm 28 geometry (e.g., the diaphragm thickness 54 and the diaphragm diameter 52), diaphragm 28 material construction (e.g., materials having a particular susceptibility to corrosion or other desired chemical properties), or diaphragm 28 mechanical properties (e.g., Young's modulus and Poisson's ratio).

In various embodiments, the measurement method includes measuring corrosion or pressure continuously over a span of time. For molten salt systems operating at low pressure, the sensor can be internally pressurized with inert gas to a known pressure. The measurement method can be used in static or transient measurement applications. The measurement method can include measuring cumulative corrosion or damage of the diaphragm 28 over a period of time. The measurement method can further include measuring changes in diaphragm 28 deflection in response to a known pressure (alternatively referred to as a "known fluid pressure") applied to a surface 74 and using the measured changes in diaphragm 28 deflection in response to the known pressure to determine a degree of corrosion, erosion, scaling and/or oxidation of the second surface 56 of the diaphragm 28. In various embodiments, the measurement method includes determining a rate of corrosion, erosion, scaling and/or oxidation of the second surface 74 of the diaphragm 28.

II. Pressure Sensing System

The fiber optic sensor is capable of fine measurements in high radiation environments, high temperature environments (e.g., 500° C. to 900° C.), and chemically aggressive environments. For example, the fiber optic sensor can be used as a pressure sensor in molten salt reactors (MSRs) and high temperature gas reactors (HTGRs) to ensure fast dynamic pressure measurements and to improve on-line health monitoring and control of these reactors. The fiber optic sensor includes the embedded optical fiber and can be used with an interferometer, for example a Michelson interferometer, a Fabry-Pérot, interferometer, or a Mach-Zehnder interferometer.

Figure 7:
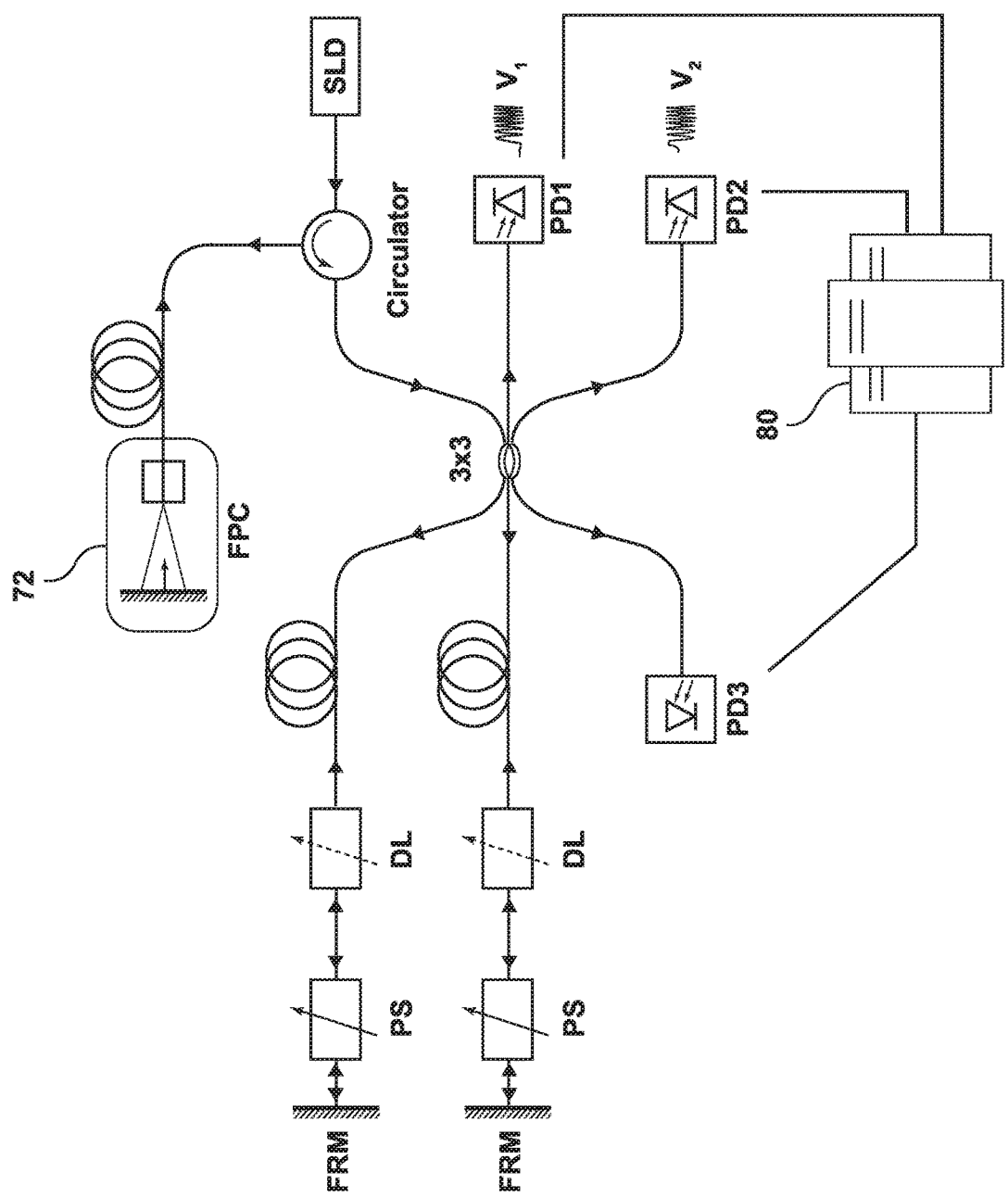
FIG. 7 is a schematic diagram of a fiber-optic pressure sensing system for high-frequency dynamic pressure measurements in corrosive, high temperature environments.

Referring now to FIG. 7, a low-coherence interferometer pressure sensing system ("LCI system") including the fiber-optic sensor of FIGS. 2-6 in combination with a Michelson interferometer is illustrated. The LCI system includes a low coherence light source, for example a superluminescent diode (SLD), which transmits low coherence light to an optical circulator. The circulator is a three-port device that functions as an optical isolator and allows light to propagate in one direction from the first port of the circulator to the second port of the circulator and from the second port of the circulator to the third port. Light entering the circulator from the low coherence light source is coupled to fiber optic sensor 72, which as noted above includes a Fabry-Pérot cavity (FPC) having a length that various as a function of pressure. Light reflected from the fiber optic sensor's internal diaphragm and from the fiber terminus reenters the optical fiber and the circulator and is input into a 3×3 coupler. The reflected light passing through the 3×3 coupler is split and one output of the 3×3 optical coupler is fed directly to a third photodetector (PD3), which measures the total optical power without the effects of interference. Interference from the two reflections that comprise the FPC does not occur in PD3 because of the low coherence length of the light source. The two remaining outputs of the 3×3 optical coupler form the two arms of a Michelson interferometer, each of which is composed of a delay line (DL), a phase shifter (PS), and a Faraday rotating mirror (FRM). The light that is reflected from the FRMs is coupled back into the same 3×3 optical coupler and is ultimately transmitted to two remaining photodetectors, PD1 and PD2. Interference occurs when the path length difference within the FPC is matched to the path length difference in the Michelson interferometer within the coherence length of the light source.

The signals $V_1$ and $V_2$ in FIG. 7 refer to the output voltages of PD1 and PD2, respectively. The path length difference of the optical fibers extending from the 3×3 optical coupler to PD1 and PD2 determines the phase offset or relative phase shift $z_0$. An analyzer 80, which may be a computer, analyzes data obtained from the low coherence interferometer system to measure changes in pressure at the fiber optic sensor 72.

More particularly, the analyzer 80 is configured to perform a real-time time-domain phase demodulation scheme (Modified Arctangent Ratio Comparison or MARC) to extract sub-nanometer length changes of the Fabry-Pérot cavity based on a ratio $R_i$ of the photodetector voltages $V_1$, $V_2$ after normalizing both voltages to the range [−1, 1]. Rather than keep a running integration of the phase difference, the phase demodulation scheme uses phase values $z_{1,i}$ or $z_{2,i}$, defined in equations (3) and (4) below, along with a correction term $C_i$.

$$z_{1,i} \approx \arctan\left(\frac{1}{\tan(z_0)} - \frac{1}{R_i \cdot \sin(z_0)}\right) \quad (3)$$

$$z_{2,i} + z_0 \approx \arctan\left(\frac{R_i}{\sin(z_0)} - \frac{1}{\tan(z_0)}\right) \quad (4)$$

The correction term $C_i$ is defined as $C_{i-1}-\pi$, $C_{i-1}+\pi$, or 0 according to equation (5) below, with $C_0$ being zero. $R_i$ (equation (6) below) is the ratio of two normalized intensities and $S_i$ is a Boolean flag, being 1 if $|R_i|$ is greater than 1 or 0 if $|R_i|$ is less than or equal to 1:

$$C_i = C_{i-1} + \begin{cases} -\pi, & \text{if } -1 \le R_i \le 1 \text{ and } S_{i-1} = 0 \\ \pi, & \text{if } R_i < 1 \text{ and } S_{i-1} = 1 \\ 0, & \text{if otherwise} \end{cases} \quad (5)$$

$$R_i = \frac{V_{1,i}}{V_{2,i}} = \frac{\cos(z_i)}{\gamma_i \cdot \cos(z_i + z_0)} \quad (6)$$

For many broadband light sources, the coherence length is much larger than the center wavelength, and $y_i \approx 1$. The analyzer calculates the total phase shift ($z_i$) in the sensing interferometer by adding the correction term to the selected phase calculation as follows:

$$z_i = C_i + \begin{cases} z_{1,i}, & \text{if } |R_i| > 1 \\ z_{2,i}, & \text{if otherwise} \end{cases} \quad (7)$$

The change in cavity length, or diaphragm deflection ($x_i$), is recovered from the calculated phase shift ($z_i$) according to equation (8) below:

$$x_i = \frac{\lambda z_i}{4\pi} \quad (8)$$

The diaphragm deflection ($x_i$) is then converted into a pressure measurement ($P_i$) in accordance with equation (9) below. The constant of proportionality ε is determined according to equation (10) below for a circular diaphragm of thickness h, radius a, Young's modulus E, and Poisson's ration v, such that a positive external pressure results in a decrease in FPC distance ($x_i$):

$$P_i = \xi x_i \quad (9)$$

$$\xi = -\frac{16Eh^3}{3a^4(1-v^2)} \quad (10)$$

The forgoing methodology is summarized in pseudocode in FIG. 8. The analyzer 80, in performing this methodology, provides a linear correlation between changes in FPC length and pressure. The LCI pressure sensor system demonstrated a range of ±270 kPa with a maximum DR of 24 dB and resolved transients of up to 3910 kPa/s. The LCI pressure sensor system can resolve 2.0 kPa dynamic pressure differences up to 2 kHz over a dynamic range of 540 kPa. Higher frequencies can be resolved at the expensive of measurement range and the dimensions and materials of the diaphragm can be selected to adjust ε based on the requirements for the specific application.

For long term measurements, darkening in the optical intensity or drift in the output of PD1 and PD2 could result in a loss of measurement integrity. To overcome this challenge, the LCI pressure sensor system includes a third photodetector PD3. The third photodetector PD3 directly measures a voltage proportional to the optical intensity over time, in the absence of interference, in which the photodetector voltage $V_0$ is proportional to the average optical intensity $I_0$ due to light reflections from the sensor cavity. The photodetector voltage is recorded prior to starting the measurement process ($V_{j0}$) and during the measurement process ($V_{ji}$), and the fractional darkening of the fiber is given by the ratio $V_{ji}/V_{j0}$. The voltage on the third photodetector PD3 ($V_{3i}$) is proportional to the optical intensity on the first photodetector PD1 and the second photodetector PD2 in the absence of interference fringes and is used as an independent measure of fiber darkening. The photodetector voltage on the interfering line ($V_{ji}$) is corrected using the fractional darkening determined using PD3 as $V'_{ji}=(V_{30}/V_{3i})V_{ji}$. Using the above MARC methodology, the voltages at the two interfering photodetectors PD1 and PD2, $V_{ji}$ at time $t_i$, are first compensated for darkening and then normalized to the range $A'_{ji} \in [-1,1]$ according to equation (11) below, where $O_0$ and $A_0$ are the initial offset and amplitude of the signal during calibration. The remainder of the MARC methodology continues as described above.

$$A'_{ji} = \frac{1}{G_j}\left(\frac{V_{30}}{V_{3i}}V_{ji} - O_j\right) \quad (11)$$

The above description is that of current embodiments. Various alterations can be made without departing from the spirit and broader aspects of the invention as defined in the claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of preparing a fiber optic sensor, the method comprising:
    ultrasonically welding a first plurality of successive layers of metallic tape together to form a lower half of a metallic body;
    forming an elongated slot within an upward-facing exterior surface of the lower half of the metallic body;
    positioning an optical fiber within the elongated slot in the exterior surface of the lower half of the metallic body;
    ultrasonically welding a second plurality of successive layers of metallic tape atop the exterior surface of the lower half of the metallic body to form an upper half of the metallic body, such that the optical fiber is a metal-embedded optical fiber, wherein the metallic body includes a first end-surface and a second end-surface defining a length therebetween, and wherein the metallic body includes an exit aperture at the first end-surface, the metal-embedded optical fiber extending along the length of the metallic body and being centrally disposed within the metallic body in widthwise and height-wise directions of the metallic body, the metal-embedded optical fiber including a terminal end at the exit aperture of the metallic body; and
    securing the metal-embedded optical fiber within a sensor housing by welding at least a portion of the metallic body to a holder of the sensor housing, the sensor housing further including a diaphragm, wherein the diaphragm is spaced apart from the terminal end of the metal-embedded optical fiber.

2. The method of claim 1 wherein the metallic tape is selected from a group consisting of aluminum alloy, nickel alloy, and stainless steel.

3. The method of claim 1 wherein the second plurality of successive layers of metallic tape is applied to the lower half of the metallic body under pressure while undergoing vibrations at a frequency of at least 10 kHz.

4. The method of claim 1 wherein the metallic body extends in the lengthwise direction of the optical fiber and includes an end portion that is flush with the terminal end of the optical fiber.

5. The method of claim 1 wherein the optical fiber includes a metallic coating prior to positioning within the elongated slot in the metallic body.

6. An apparatus comprising:
    a low coherence light source for generating a light output;
    an optical circulator for receiving the light output from the low coherence light source;
    a fiber optic sensor optically coupled to the optical circulator and including an optical fiber embedded in a metal matrix, the optical fiber including a fiber terminus opposite a reflecting surface of a diaphragm;

an optical interferometer optically coupled to the optical circulator, the optical interferometer being adapted to produce an interferometry output using light from the low coherence light source reflected off the reflecting surface of the diaphragm; and an analyzer that receives the interferometry output and, based on the interferometry output, determines a phase difference induced at the fiber optic sensor, converts the phase difference into a physical displacement of the diaphragm, and converts the physical displacement of the diaphragm into an analyzer output that is indicative of a pressure difference across the diaphragm, wherein the optical interferometer comprises:
- a 3×3 optical coupler,
- a first arm of the interferometer coupled to the 3×3 optical coupler and including a first Faraday rotating mirror, a first delay line, and a first phase shifter,
- a second arm of the interferometer coupled to the 3×3 optical coupler and including a second Faraday rotating mirror, a second delay line, and a second phase shifter,
- a first photodetector to receive reflected light via the 3×3 optical coupler and having a first output,
- a second photodetector to receive reflected light via the 3×3 optical coupler and having a second output,
- a third photodetector to receive reflected light via the 3×3 optical coupler and having a third output,
- wherein a first optical fiber path length extending between the 3×3 optical coupler and the first photodetector differs from a second optical fiber path length extending between the 3×3 optical coupler and the second photodetector,
- wherein determining the phase difference induced at the fiber optic sensor is based on a ratio of a normalized intensity of the first output relative to a normalized intensity of the second output.

7. The apparatus of claim 6 wherein the interferometer includes a third photodetector to output third output comprises a voltage proportional to an optical intensity of a non-interfering optical signal.

8. The apparatus of claim 7 wherein the analyzer is configured to compensate for a darkening in the optical fiber based on a change in an intensity of the non-interfering optical signal over time.

9. The apparatus of claim 7 wherein the non-interfering optical signal is output from the 3×3 optical coupler.

10. The apparatus of claim 6 wherein the low coherence light source includes a superluminescent diode optically coupled to the fiber optic sensor.

11. The apparatus of claim 6 wherein the metal matrix extends in the longitudinal direction of the optical fiber, the optical fiber being centrally disposed within the metal matrix.

12. The apparatus of claim 6 wherein the optical fiber includes a silica fiber and wherein the metallic matrix includes aluminum alloy, nickel alloy, or stainless steel.

13. The apparatus of claim 6 wherein a difference between the first delay line and the second delay line is adjusted such that an optical path length difference in the first and second arms of the interferometer equals an optical path length difference in the fiber optic sensor.

* * * * *